United States Patent [19]
Miyagawa et al.

[11] Patent Number: 6,098,288
[45] Date of Patent: Aug. 8, 2000

[54] RECIPROCATING-TYPE ELECTRIC SHAVER

[75] Inventors: Syuji Miyagawa; Takafumi Hamabe, both of Hirakata; Masao Tanahashi, Hikone, all of Japan

[73] Assignee: Matsushita Electric Works, Ltd., Osaka, Japan

[21] Appl. No.: 09/155,541

[22] PCT Filed: Mar. 26, 1997

[86] PCT No.: PCT/JP97/01026

§ 371 Date: Sep. 25, 1998

§ 102(e) Date: Sep. 25, 1998

[87] PCT Pub. No.: WO97/35691

PCT Pub. Date: Oct. 2, 1997

[30] Foreign Application Priority Data

Mar. 26, 1996 [JP] Japan .................................. 8-070707

[51] Int. Cl.[7] .................................................. B26B 19/02
[52] U.S. Cl. .......................... 30/43.91; 30/43.92; 30/210; 30/277.4
[58] Field of Search ............... 30/43.91, 43.92, 30/34.1, 43.7, 44, 45, 277.4, 29.5, 369, 210

[56] References Cited

U.S. PATENT DOCUMENTS

| | | |
|---|---|---|
| 1,613,953 | 1/1927 | Jones . |
| 1,659,905 | 2/1928 | Aron . |
| 1,798,756 | 3/1931 | Redfield . |
| 2,827,695 | 3/1958 | Vitale ......................................... 30/210 |
| 2,883,747 | 4/1959 | Johnson et al. ........................... 30/45 X |
| 3,372,481 | 3/1968 | Sleimmer .................................. 30/210 |
| 4,348,810 | 9/1982 | Oda et al. ................................. 30/210 |
| 4,583,027 | 4/1986 | Parker et al. . |
| 4,868,988 | 9/1989 | Han .......................................... 30/210 |

FOREIGN PATENT DOCUMENTS

| | | |
|---|---|---|
| 0674979 | 10/1995 | European Pat. Off. . |
| 7-265560 | 10/1995 | Japan . |
| 94/27303 | 11/1994 | WIPO . |
| 97/29534 | 4/1997 | WIPO . |

OTHER PUBLICATIONS

English Language Abstract of JP No. 7–265560.

*Primary Examiner*—Douglas D. Watts
*Attorney, Agent, or Firm*—Greenblum & Bernstein, P.L.C.

[57] ABSTRACT

An electromagnetic linear actuator including a stator having an electromagnetic coil, and at least one movable element made of a permanent magnet or a magnetizable material and operable to reciprocate the movable element in a linear direction, and a cutter head including at least first and second blade members adapted to be driven by the electromagnetic linear actuator to cooperate with each other to perform a hair cutting with the first blade member coupled with the movable element. The cutter head is disposed on a line of extension in a direction conforming to a direction of movement of the movable element and that the first blade member is reciprocatingly driven substantially in the same direction as the direction of movement of the movable element. Where the first blade member is a single movable blade, the second blade member may be either a stationary blade or a movable blade or the both.

16 Claims, 11 Drawing Sheets

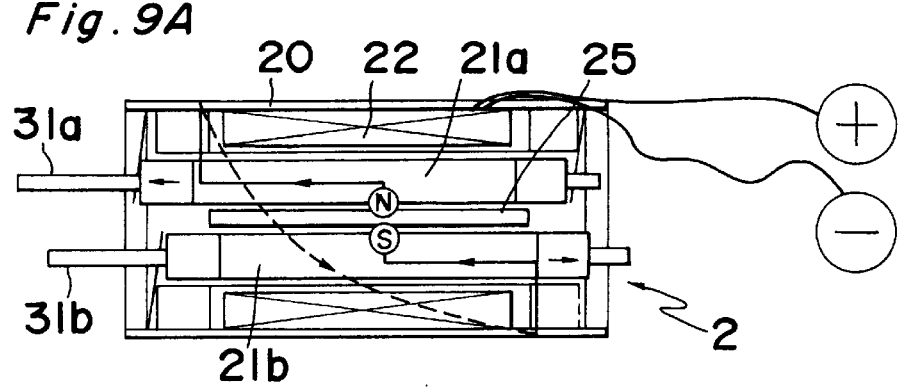
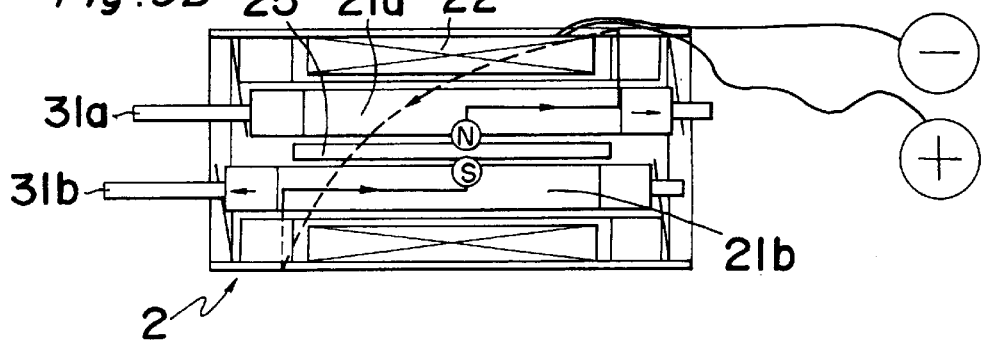
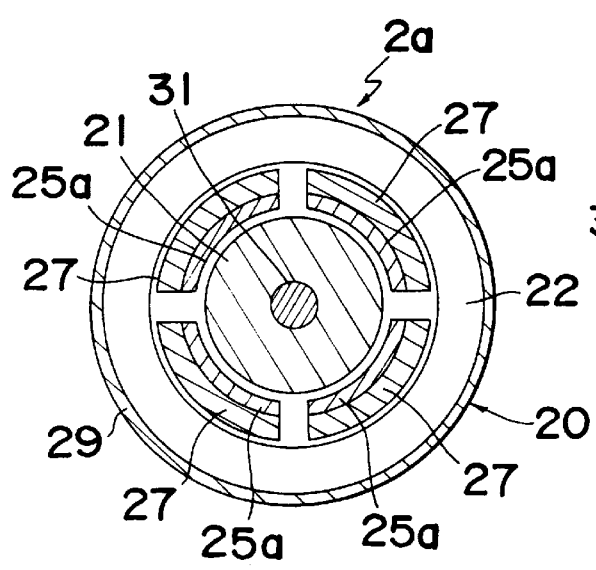
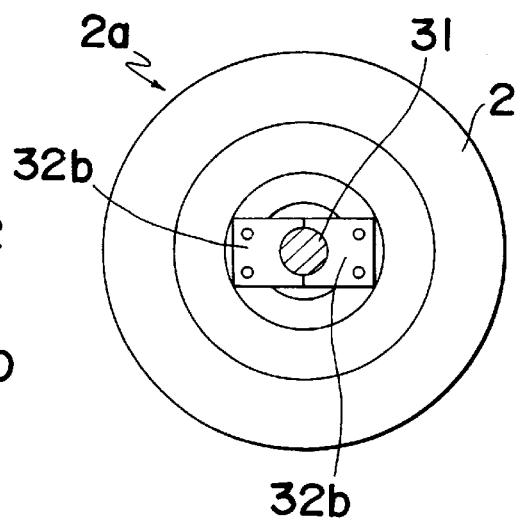

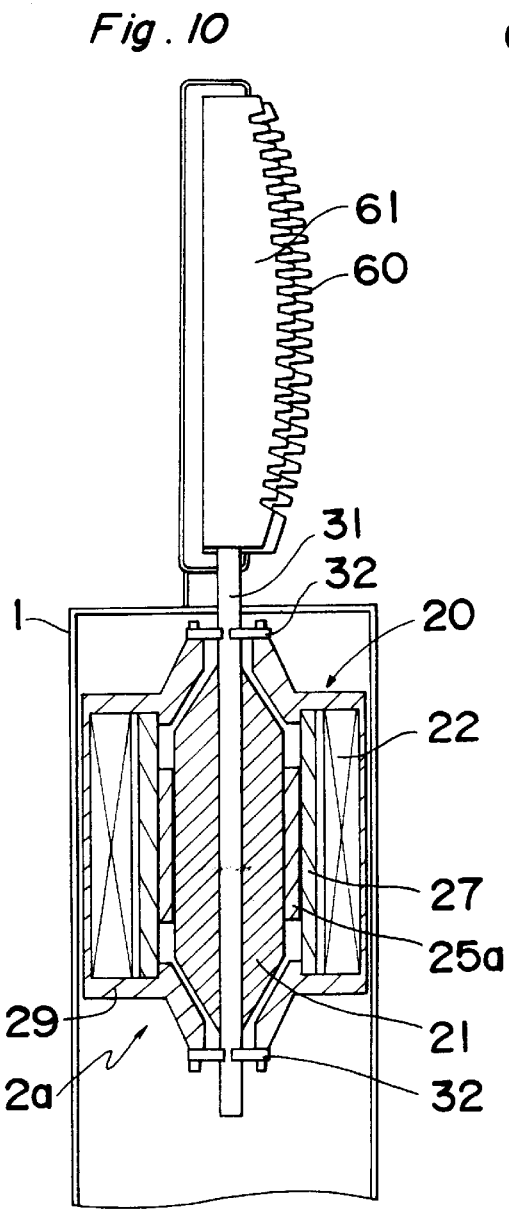
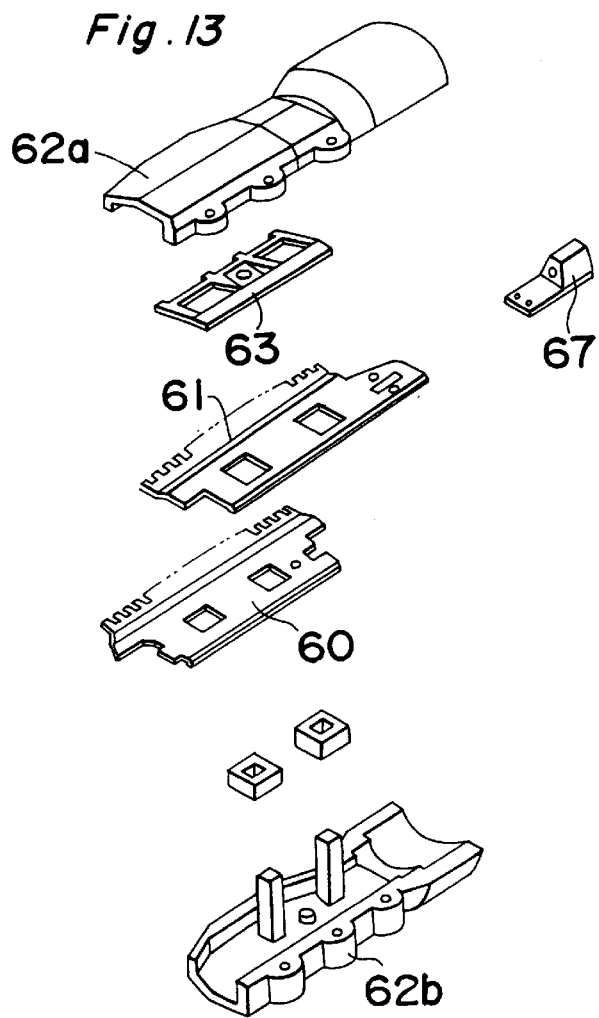
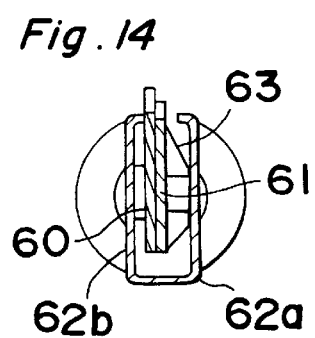

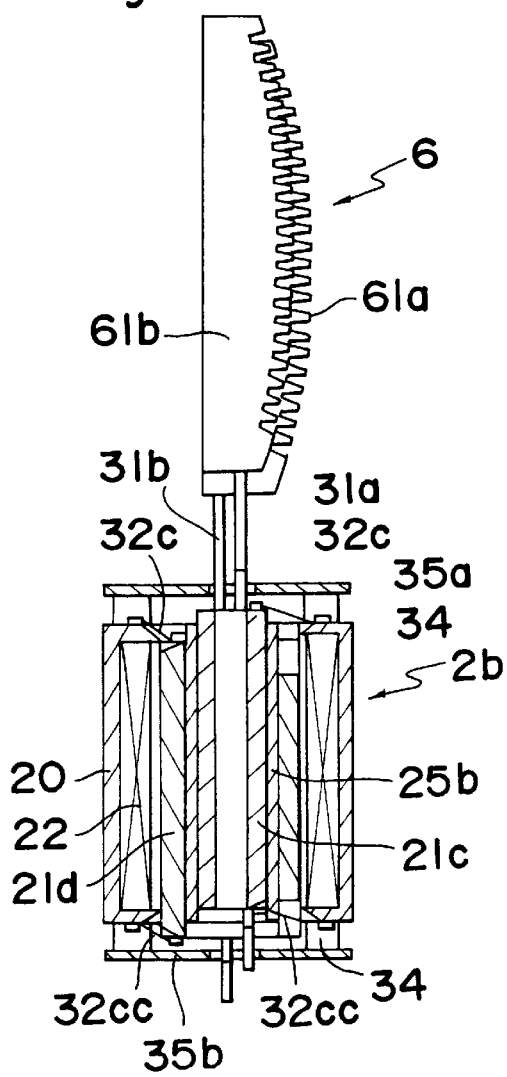
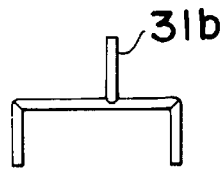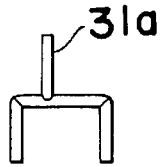
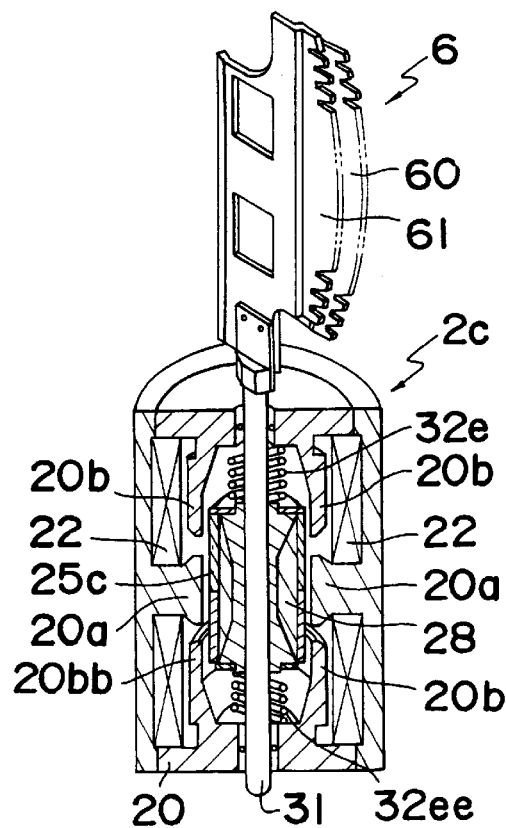

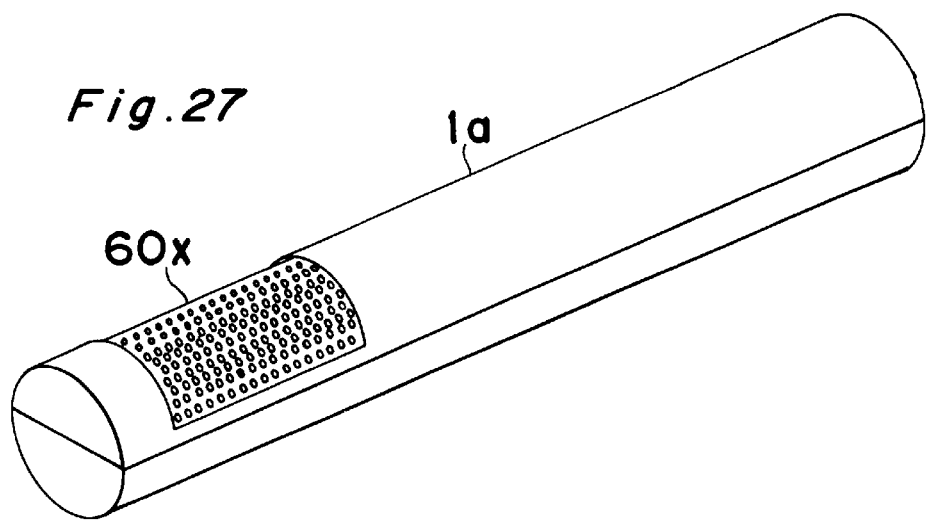
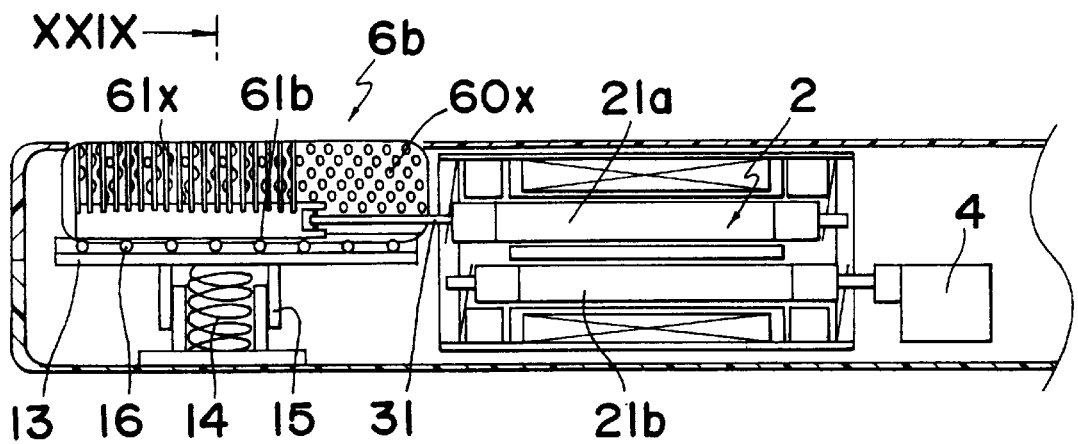
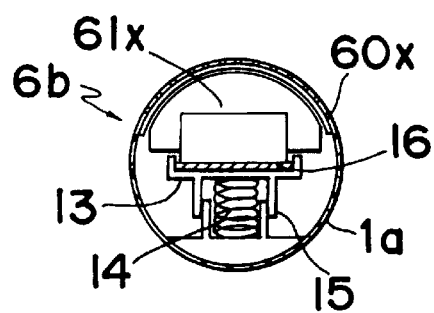

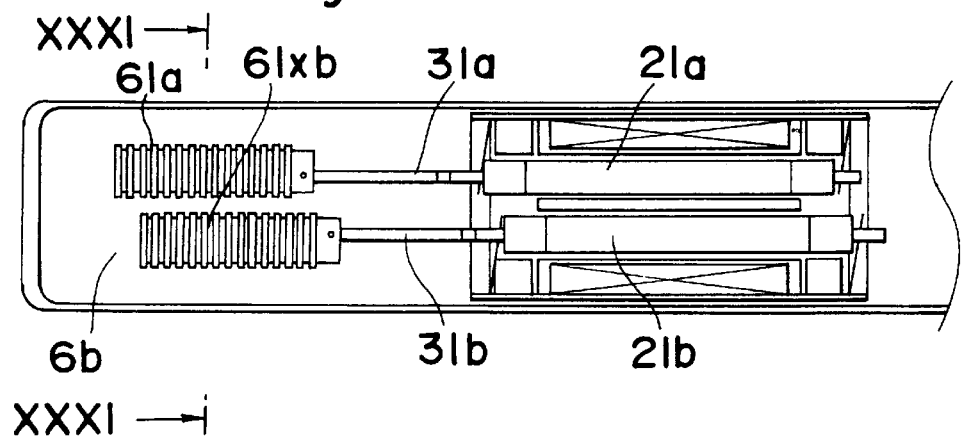
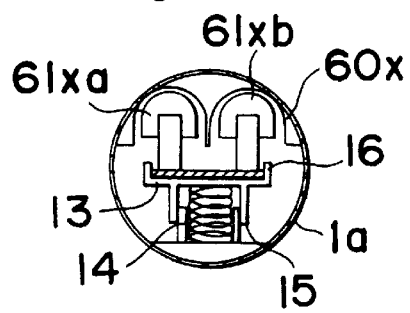
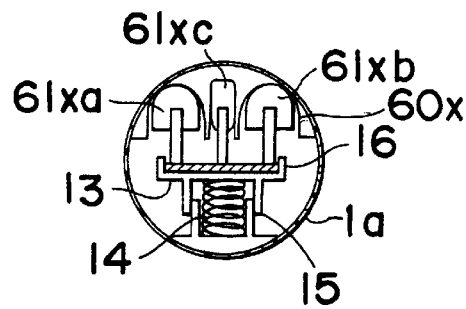
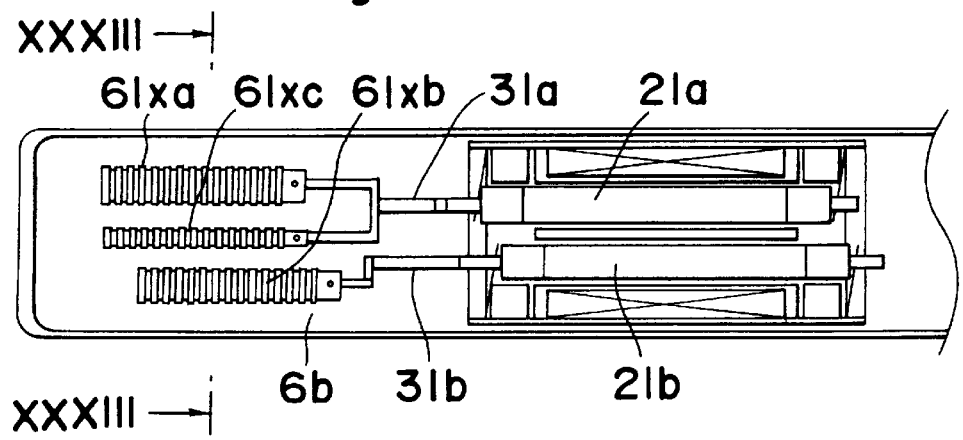

RECIPROCATING-TYPE ELECTRIC SHAVER

FIELD OF THE INVENTION

The present invention generally relates to an electric shaver and, more particularly, to the electric shaver of a reciprocating type comprising a cutter head including at least two blade members one reciprocatingly movable relative to the other.

BACKGROUND ART

The reciprocating-type electric shaver is currently available in a number of types, all of which have a common structural feature in that they comprises a casing of, for example, a cylindrical or rectangular box-like configuration having a longitudinal axis, and a cutter head mounted on one end of the casing. The cutter head employed in such electric shavers includes a stationary blade member in the form of a perforated metal foil, and at least one movable blade member comprised of an array of generally semi-circular blades and adapted to be reciprocatingly driven relative to the stationary blade member in a direction perpendicular to the direction in which the shaver is moved during hair cutting and also to the longitudinal axis of the casing. As a drive source for the movable blade member other than an electric rotary actuator, the use of an electromagnetic linear motor is disclosed in European Patent Publication No. A1-674979 which has been laid-open to public.

In the cutter head of the electric shaver of the type disclosed in the above mentioned European Patent Application, the movable blade member is adapted to be reciprocatingly driven relative to the stationary blade member by an electromagnetic linear actuator. The electromagnetic linear actuator includes an electromagnet and a permanent magnet fitted to a carrier of the movable blade member. The carrier of the movable blade member is floatedly supported by a leaf spring so as to define a magnetic gap between it and the electromagnet. This electromagnetic linear actuator is so designed that when an alternating current is applied to the electromagnet to alternately develop a magnetic force of repulsion and a magnetic force of attraction in the magnetic gap, the carrier of the movable blade member and, hence, the movable blade member itself can be reciprocated in a direction perpendicular to the longitudinal axis of the casing.

In the electric shaver of a type wherein the rotary actuator is used and the movable blade member is reciprocated in a direction perpendicular to a drive shaft of the rotary actuator, the use is necessitated of a motion translating mechanism for translating a rotary motion into a linear motion. On the other hand, the electric shaver utilizing the electromagnetic linear actuator does not require the use of such a motion translating mechanism and, therefore, has such advantages that a mechanical loss is relatively low and the efficiency of utilization of power is relatively high. In addition, elimination of the use of the motion translating mechanism makes it possible to reduce the size of the electric shaver.

On the other hand, a generally elongated slender electric shaver particularly for use in treatment of human body hairs such as downy hairs and eyebrows has been made available in the market. This electric shaver comprises a generally cylindrical casing, a stationary blade extending outwardly from one end of the casing in a direction along the longitudinal axis of the casing, and a generally comb-like movable blade adapted to be reciprocatingly driven relative to the stationary blade. In such electric shaver, a rotary actuator is employed to drive the movable blade and, therefore, a motion translating mechanism is also employed to allow a drive shaft of the actuator to provide a linear motion that is necessary to drive the movable blade.

As far as the electric shaver for use in treatment of the human body hairs, the slimmer and shorter, the more convenient to handle. However, the use of the rotary actuator in combination with the motion translating mechanism as discussed above does not only limit the extent to which the electric shaver can be assembled slim, but also renders the cylindrical casing to have an extra length necessary to accommodate the motion translating mechanism. By way of example, assuming that the rotary actuator is of a type powered by an A-III power cell, disposition of the power cell and the rotary actuator in line with each other within the casing results in the casing increased in length a quantity substantially larger than the width of the palm of a user's hand, which length is further increased when the motion translating mechanism is used.

DISCLOSURE OF THE INVENTION

Accordingly, the present invention has been devised to substantially eliminate the above discussed problems inherent in the electric shaver, particularly the electric shaver for treatment of the unwanted human body hairs and is intended to provide an improved reciprocating-type electric shaver of a type having a minimized mechanical loss and also having a high efficiency of utilization of power.

It is another object of the present invention to provide the reciprocating-type electric shaver of the type referred to above which is compact and slim and which has a reduced length sufficient to allow a portion of the electric shaver other than the cutter head to work in the palm of the user's hand.

In order to accomplish these objects, the reciprocating-type electric shaver provided in accordance with the present invention comprises an electromagnetic linear actuator, including a stator provided with an electromagnetic coil and at least first movable element in the form of either a permanent magnet or a magnetizable material, and operable to linearly reciprocate the movable element, and a cutter head adapted to be driven by the movable element. The cutter head is disposed on an extension conforming to the direction of movement of the movable element.

The cutter head may comprise either at least a first movable blade coupled with the first movable element or at least a first movable blade and a stationary blade in which case the first movable blade is coupled with the first movable element for reciprocating movement relative to and in sliding contact with the stationary blade. Alternatively, the cutter head may comprise a stationary blade and two movable blades disposed on respective sides of the stationary blade for sliding movement relative to the stationary blade and also for movement relative to each other in respective phases opposite to each other.

Where the two movable blades are employed, the electromagnetic linear actuator additionally includes a second movable element and the first and second movable elements are to be driven in respective phases opposite to each other. In such case, the first movable element is in the form of a solid or hollow cylinder and the second movable element is in the form of a hollow cylinder with the first movable element coaxially accommodated within the hollow of the second movable element. Alternatively, the first and second movable elements may be of a shape having a generally semi-circular cross-section and be juxtaposed within the hollow of the stator. In either case, the first and second movable blades reciprocate in sliding contact with each other to cut hairs.

Where the two movable blades are employed, the stroke of movement of the movable blade can be reduced substantially half the stroke required in the cutter head employing a combination of the movable and stationary blades. In other words, such an advantage can be appreciated that each of the two movable blades suffices to be driven a distance which is substantially half the stroke of movement that is required for the movable blade to undergo relative to the stationary blade. Accordingly, it is evident that reduction of the stroke of movement makes it possible to reduce the bulkiness, particularly the length, of the electric shaver and, hence, to fabricate a compact electric shaver.

In a preferred embodiment of the present invention in which two movable elements are employed together with the movable and stationary blades, one of the movable elements which is not coupled with the movable blade may be provided with a counterweight to suppress unwanted vibration of such movable element. Also, regardless of whether the counterweight is used or whether it is not used, the two movable elements may be drivingly coupled with each other by means of a linkage means operable to transmit a motion of one of the movable elements to the other of the movable elements.

In any event, the movable element is coupled with the stator with its opposite ends secured thereto by means of flexible support members displaceable in a direction conforming to the direction of movement of the movable element. At this time, the movable element is kept spaced apart from the stator.

According to the present invention, no motion translating mechanism is needed since the use has been made of the electromagnetic linear actuator and since the movable element of the actuator is drivingly coupled through an axial rod with the movable blade to drive the latter. For this reason, not only can a mechanical loss, which would otherwise be brought about as a result of motion translation, be eliminated, but the electric shaver can be assembled compact and the limited power available from the power cell can be saved.

BRIEF DESCRIPTION OF THE DRAWINGS

FIGS. 9A and 9B are schematic side sectional views used to explain the sequence of operation of the electromagnetic linear actuator;

FIG. 10 is a schematic longitudinal sectional view of the electric shaver according to a second embodiment of the present invention;

FIG. 11 is a transverse sectional view of the electromagnetic linear actuator used in the electric shaver of FIG. 10;

FIG. 12 is a top end view of the electromagnetic linear actuator used in the electric shaver of FIG. 10, showing a support spring member;

FIG. 13 is an exploded view of the cutter head used in the electric shaver of FIG. 10;

FIG. 14 is a schematic transverse sectional view of the cutter head of FIG. 13 in an assembled condition;

FIG. 16 is a schematic longitudinal sectional view of the electric shaver according to a third embodiment of the present invention;

FIG. 19A and 19B are side views showing respective leg members used to connect associated axial rods in the electromagnetic linear actuator of FIG. 17 with corresponding movable elements, respectively;

FIG. 21 is a perspective view, with a portion cut out, of the electric shaver according to a fourth embodiment of the present invention;

FIG. 27 is a schematic perspective view of the electric shaver according to a seventh embodiment of the present invention;

FIG. 28 is a schematic longitudinal sectional view of the electric shaver according to the seventh embodiment of the present invention;

FIG. 29 is a cross-sectional view taken along the line XXIX—XXIX in FIG. 18;

FIG. 30 is a schematic longitudinal sectional view of the electric shaver according to an eighth embodiment of the present invention;

FIG. 31 is a cross-sectional view taken along the line XXXI—XXXI in FIG. 30;

FIG. 32 is a schematic longitudinal sectional view of the electric shaver according to a ninth embodiment of the present invention; and FIG. 33 is a cross-sectional view taken along the line XXXIII—XXXIII in FIG. 32.

BEST MODE FOR CARRYING OUT THE INVENTION (First Embodiment)

Figure 1:
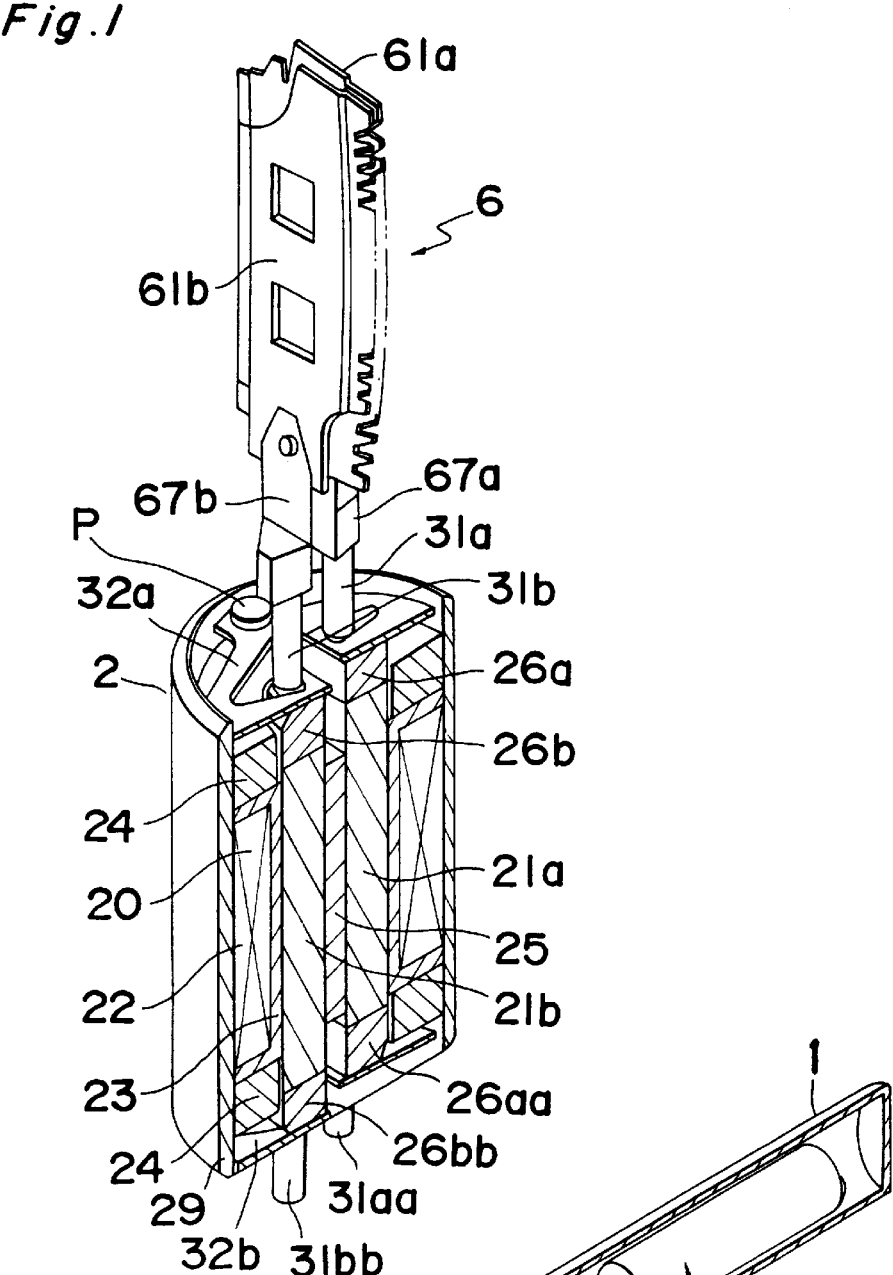
FIG. 1 is a perspective view, with a portion cut out, of an electric shaver according to a first embodiment of the present invention.
Figure 2:
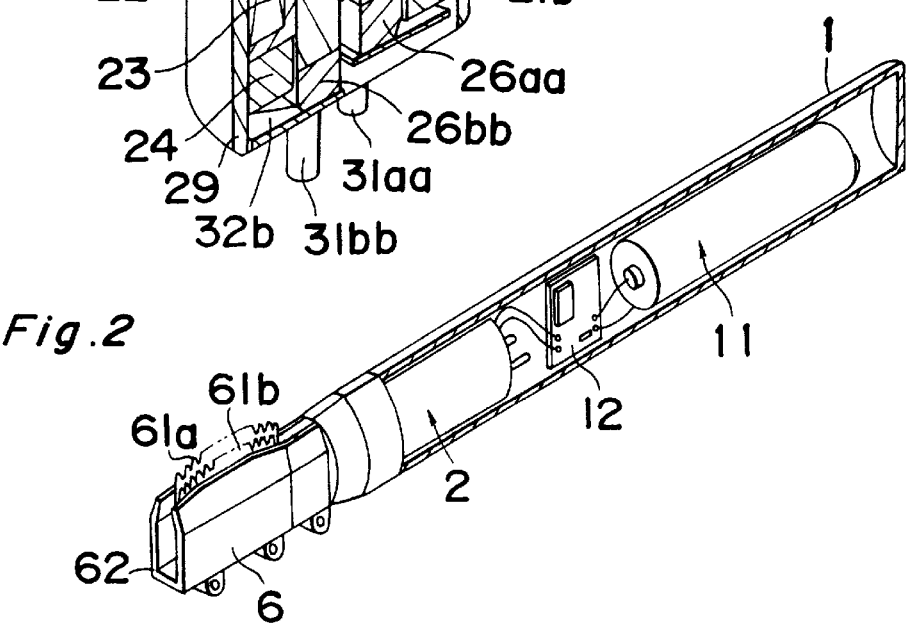
FIG. 2 is a perspective view, with a portion cut out, of the electric shaver according to the first embodiment of the present invention shown in an assembled condition.

FIGS. 1 to 6 illustrate an electric shaver according to a first embodiment of the present invention. The electric shaver shown therein is suited for use in treatment of human body hairs such as downy hairs and eyebrows. This electric shaver comprises, as shown in FIG. 2, a generally cylindrical casing 1 and a cutter head 6 mounted on one end of the casing 1. The cylindrical casing 1 has an outer diameter corresponding to the sum of the diameter of a commercially available A-III or A-IV power cell used as an electric power source and twice the wall thickness of the casing 1 and also has an interior in which an electromagnetic linear actuator 2 and the power source 11 are accommodated in line with each other with a circuit board 12 positioned therebetween. The electromagnetic linear actuator 2 is fixedly accommodated within the casing 1 at one end thereof adjacent the cutter head 6, and the opposite end of the casing 1 remote from the cutter head 6 is open for insertion or removal of the power source 11 into or from the casing and is normally closed by an end cap.

The details of the electromagnetic linear actuator 2 are shown in FIGS. 1, 3, 4A and 4B. The electromagnetic linear actuator 2 is of a size having a diameter comparable to the diameter of the power cell, particularly the A-III or A-IV power cell which serves as the power source 11 and comprises a hollow cylindrical stator 20 of a structure including a tubular electromagnetic coil 22 disposed within an open-ended cylindrical clad casing 29, first and second movable elements 21a and 21b made of a magnetizable material and accommodated with a cylindrical inner hollow of the tubular electromagnetic coil 22, and a substantially rectangular plate-like permanent magnet 25 interposed between the first and second movable elements 21a and 21b.

The electromagnetic coil 22 is formed by winding an electric wire around a cylindrical bobbin 23, and engagement rings 24a and 24b made of magnetizable material are fixed externally to respective annular flanges integral with opposite ends of the wire-wound cylindrical bobbin 23. This electromagnetic coil 22 is fixedly retained within the cylindrical clad casing 29 at a location generally intermediate of the length thereof with the engagement rings 24a and 24b received under interference fit within the cylindrical clad casing 29.

Figure 3:
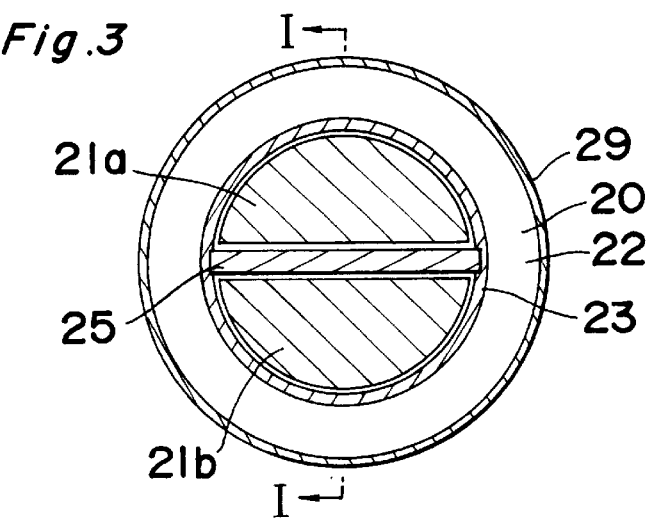
FIG. 3 is a transverse sectional view of an electromagnetic linear actuator used in the electric shaver shown in FIG. 1.

As best shown in FIG. 3, the rectangular plate-like permanent magnet 25 has a width somewhat larger than the diameter of the cylindrical hollow of the bobbin 23 on one hand and, on the other hand, the bobbin 23 has its inner peripheral surface formed with diametrically opposed support grooves such that the permanent magnet 25 is supported within the inner hollow of the bobbin 23 with its opposite side edges received in the support grooves. The permanent magnet 25 so supported as previously described divides the cylindrical inner hollow of the bobbin 23 into two equal chambers of a generally semi-circular cross-section.

The movable elements 21a and 21b have a generally semi-circular cross-section and are accommodated within the respective chambers, that are divided by the permanent magnet 25 within the bobbin 23, for movement in respective directions parallel to the longitudinal axis of the stator 20. The permanent magnets 25 has first and second surfaces opposite to each other which are held in face-to-face relation with the movable elements 21a and 21b, respectively. The first and second surfaces of the permanent magnet 25 are magnetized to respective polarities opposite to each other. In the illustrated embodiment, as shown in FIGS. 9A and 9B, the first surface of the permanent magnet 25 confronting the first movable element 21a is magnetized to N-pole whereas the second surface of the permanent magnet 25 confronting the second movable element 21b is magnetized to S-pole. Accordingly, when an alternating current is supplied across the electromagnetic coil 22 as will be described later, respective polarities at the opposite ends of the bobbin 23 cyclically reverse relative to each other according to the frequency of the alternating current flowing across the electromagnetic coil 22, causing the first and second movable elements 21a and 21b to reciprocate relative to each other in respective phases opposite to each other in a direction parallel to the longitudinal axis of the casing 1.

Each of the movable elements 21a and 21b has axial rods 31a or 31b and 31aa or 31bb formed integrally therewith or secured thereto so as to extend outwardly from opposite ends of the respective movable element 21a or 21b in coaxial relation with each other. In the illustrated embodiment, the axial rod 31a or 31b has a length somewhat greater than the axial rod 31aa or 31bb, but the both may have an equal length and, in particular, the length of each of the axial rods 31a, 31b, 31aa and 31bb may be suitably chosen in consideration of the stroke of movement of the associated movable elements 21a and 21b.

Figure 4A:
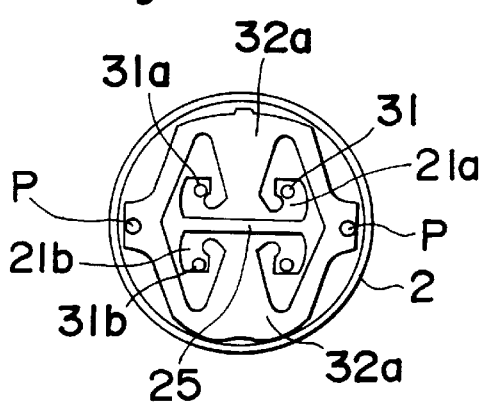
FIG. 4A is a schematic top plan view showing a first support spring member employed at one end of the electromagnetic linear actuator of FIG. 3.
Figure 4B:
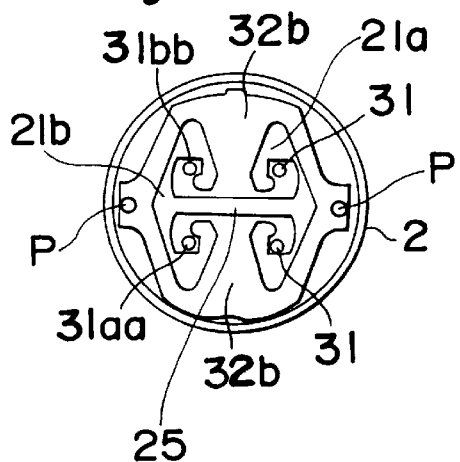
FIG. 4B is a schematic top plan view showing a second support spring member employed at the opposite end of the electromagnetic linear actuator of FIG. 3.
Figure 5:
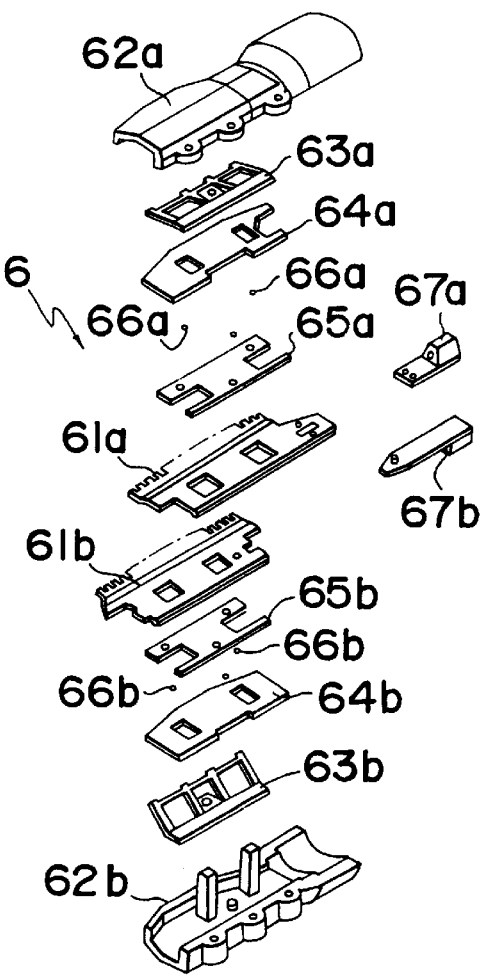
FIG. 5 is an exploded view of a cutter head used in the electric shaver according to the first embodiment of the present invention.
Figure 6:
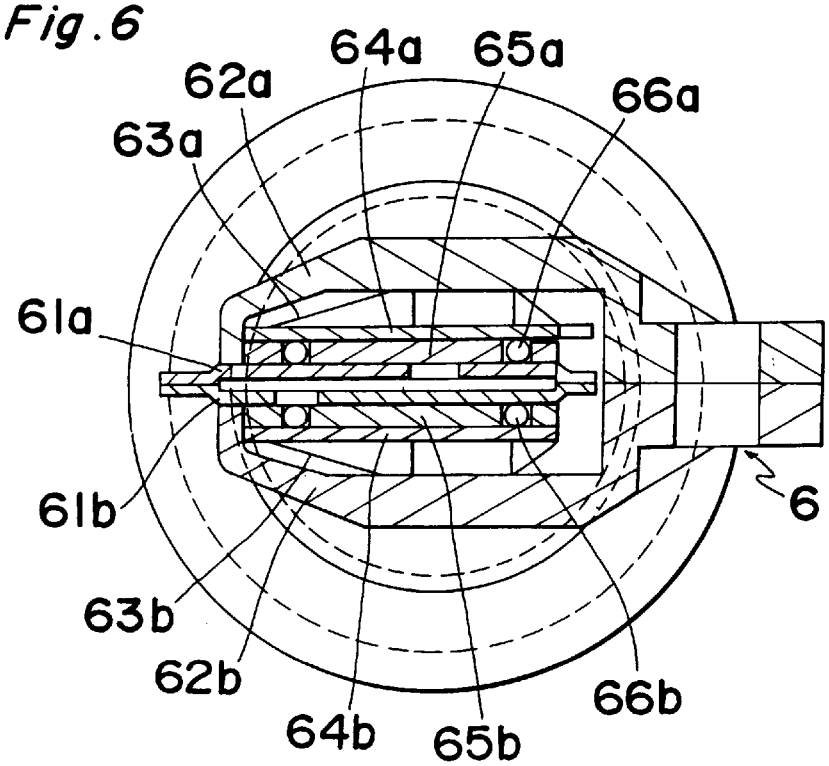
FIG. 6 is a transverse sectional view, on an enlarged scale, showing the cutter head of FIG. 5 in an assembled condition
Figure 7:
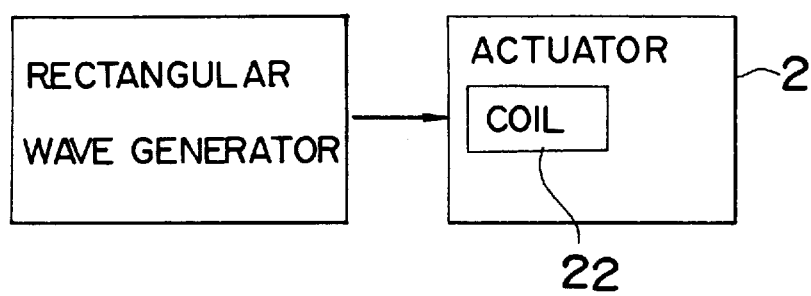
FIG. 7 is a circuit block diagram showing a drive circuit for driving the electromagnetic linear actuator.

Referring to FIGS. 1, 4A and 4B, in the respective chambers defined within the hollow of the bobbin 23, the movable elements 21a and 21b are movably supported by means of first and second support spring members 32a and 32b, disposed adjacent the opposite ends of the movable elements 21a and 21b, in a manner which will now be described, so as to define associated magnetic gaps between respective curved surfaces of the movable elements 21a and 21b and the inner peripheral surface of the bobbin 23 and also between respective flat surfaces of the movable elements 21a and 21b and the opposite surfaces of the permanent magnet 25.

The first support spring member 32a is generally ring-shaped and fixedly connected to one end of the stator 20 adjacent the cutter head 6 by means of anchor pins P. This first support spring member 32a is formed integrally with first and second elastic tongues of a generally T-shaped configuration each having includes a pair of arms. With this first support spring member 32a fixed to that end of the stator 20, the first and second elastic tongues extend radially inwardly of the clad casing 29 so as to overlay respectively the associated ends of the first and second movable elements 21a and 21b.

One of the arms of the first elastic tongue of the first support spring member 32a is fixedly connected to the first movable element 21a by means of a suitable fastening means such as, for example, an anchor pin, whereas the other of the arms of the first elastic tongue of the first support spring member 32a is engaged with the axial rod 31a. Similarly, one of the arms of the second elastic tongue of the first support spring member 32a is fixedly connected to the second movable element 21b by means of a similar fastening means such as, for example, an anchor pin, whereas the other of the arms of the second elastic tongue of the first support spring member 32a is engaged with the axial rod 32a.

On the other hand, the second support spring member 32b is of a shape similar to that of the first support spring member 32 and is fixedly connected to the other end of the stator 20, having been formed integrally with first and second elastic tongues that overlay respectively the opposite ends of the first and second movable elements 21a and 21b. One of the arms of the first elastic tongue of the second support spring member 32b is fixedly connected to the first movable element 21a by means of a suitable fastening means such as, for example, an anchor pin, whereas the other of the arms of the first elastic tongue of the second support spring member 32b is engaged with the axial rod 31aa. Similarly, one of the arms of the second elastic tongue of the second support spring member 32b is fixedly connected to the second movable element 21b by means of a similar fastening means such as, for example, an anchor pin, whereas the other of the arms of the second elastic tongue of the second support spring member 32b is engaged with the axial rod 32bb.

In the structure described above, the first and second support spring members 32a and 32b support the first movable element 21a within the corresponding chamber inside the bobbin 23 with the respective first elastic tongues thereof held in contact with the opposite ends of the first movable element 21a so as to sandwich the first movable element 21a therebetween through respective flange pieces 26a and 26aa and, also, so as to encompass the axial rods 31a and 31aa so that the magnetic gap can be formed between the first movable element 21a and the inner peripheral surface of the bobbin 23 and between the first movable element 21a and the first surface (N-pole surface) of the permanent magnet 25. On the other hand, the first and second support spring members 32a and 32b also support the second movable element 21b within the corresponding chamber inside the bobbin 23 with the respective second elastic tongues thereof held in contact with the opposite ends of the second movable element 21b so as to sandwich the second movable element 21b therebetween through respective flange pieces 26b and 26bb and, also, so as to encompass the axial rods 31b and 31bb so that the magnetic gap can be formed between the second movable element 21b and the inner peripheral surface of the bobbin 23 and between the second movable element 21b and the second surface (S-pole surface) of the permanent magnet 25.

Since the first and second movable elements 21a and 21b are supported respectively by the support spring members 32a and 32b in the manner described above, axial movement of each of the movable elements 21a and 21b along the longitudinal axis thereof takes place against a resilient forces of one of the first and second elastic tongues of each support spring member 32a and 32b depending on the direction of movement, accompanied by deformation of such elastic tongue against its own resiliency.

In this configuration, the axial rods 32a and 31b adjacent the cutter head 6 extends outwardly from the respective movable elements 21a and 21b in a parallel relation to each other and also to the longitudinal axis of the cylindrical casing 1. Preferably, the axial rods 31a and 31b have their own longitudinal axes positioned on respective sides of the longitudinal axis of the cylindrical casing 1 and spaced a distance as small as possible, but this is not always essential to the present invention.

In the embodiment described hereinabove, each of the movable elements has been described having the axial rods 31a and 31aa or 31b and 31bb protruding outwardly from the opposite ends thereof. However, the provision of the axial rods 31aa and 31bb protruding outwardly from the respective ends of the movable elements 21a and 21b remote from the cutter head 6 is not always essential to the present invention and, where the axial rods 31aa and 31bb are dispensed with, the arms of the first and second elastic tongues of the second support spring member 32b may be secured to those ends of the movable elements 21a and 21b. Also, instead of the use of the separate axial rods 31a and 31aa, a single axial rod may be employed so as to extend completely across the length of the first movable element 21a with its opposite ends protruding outwardly from the ends of the first movable element 21a, and a similar description equally applies to the axial rods 31b and 31bb.

In addition, as shown in FIGS. 19A and 19B, each of the axial rods 31a and 31b may be of a design wherein one end of the respective axial rod 31a or 31b adjacent the corresponding movable element 21a or 21b is bifurcated so as to have two legs, in which case the bifurcated legs are to be secured to the corresponding movable element 21a or 21b with the arms of the first or second elastic tongue of the first support spring member 32a engaged therewith.

Hereinafter, the details of the cutter head 6 will be described with particular reference to FIGS. 1, 2, 5 and 6. The illustrated cutter head 6 is of a generally rectangular configuration having its longitudinal axis substantially coaxially aligned with the longitudinal axis of the casing 1. The cutter head 6 includes two movable blades 61a and 61b of a generally rectangular shape and two protective cover members 62a and 62b of a similarly rectangular shape. The movable blades 61a and 61b are, while juxtaposed so as to move in sliding contact with and relative to each other, accommodated within a generally flattened operative chamber defined between the protective cover members 62a and 62b when the latter are mated together. Backup plates 64a and 64b of a generally rectangular shape are interposed between the protective cover member 62a and the adjacent movable blade 61a and between the protective cover member 62b and the adjacent movable blade 61b, respectively, and are normally biased towards the adjacent movable blades 61a and 61b by means of respective leaf spring members 63a and 63b, one interposed between the protective cover member 62a and the backup plate 64a and the other between the protective cover member 62b and the backup plate 64b.

To avoid a frictional contact between each movable blade 61a and 61b and the associated backup plate 64a and 64b then urged towards the adjacent movable blade 61a or 61b by the respective leaf spring member 63a or 63b and, on the other hand, to facilitate a smooth movement of each movable blade 61a and 61b relative to the associated backup plate 64a and 64b, linear bearing members are interposed between the backup plate 64a and the movable blade 61a and between the backup plate 64b and the movable blade 61b, respectively. Each linear bearing member includes a retainer plate 65a or 65b having a plurality of balls 66a or 66b freely rotatably carried thereby. In a simplified form of embodiment of the present invention, in place of the leaf spring members 63a and 63b, or instead of the use of the component parts 63a and 63b; 64a and 64b; and 65a and 65b, the protective cover members 62a and 62b may have their inner surfaces formed integrally with respective elastic tongues to keep the movable blades 61a and 61b in sliding contact with each other.

The blade assembly comprising the two leaf spring members, the two backup plates, the two linear bearings and the two movable blades all arranged in the manner described above is preferably non-detachably fitted to one of the protective cover members 62a and 62b, for example, the protective cover member 62b. For this purpose, all of the two leaf spring members, the two backup plates, the two linear bearings and the two movable blades forming the blase assembly may have at least one, preferably two axial slots defined therein with their longitudinal axes extending parallel to the direction of movement of the movable blades, so that corresponding support pins formed integrally with the inner surface of the protective cover member 62b so as to extend perpendicular to such inner surface of the protective cover member 62b can support the blade assembly while passing through those slots with free ends of such support pins flattened or fuse-bonded with stopper pieces. It is, however, to be noted that the slots formed in each of the movable blades 61a and 61b should have an axial length determined in consideration of the stroke of movement of the respective movable blade.

The protective cover members 62a and 62b are so designed and so configured that one of the protective cover members can be snapped onto the other of the protective cover members to complete a blade covering. At this time, respective saw-toothed edges of the first and second movable blades 61a and 61b are exposed to the outside through an elongated gap defined between corresponding side edges of the protective cover members 62a and 62b then overlapping one above the other. The blade covering employed in the illustrated embodiment is of a two-component design, one adapted to be snapped onto the other. However, instead of use of the snap-on system, the protective cover members 62a and 62b may of a unitary structure wherein the both are integrally connected together through a thin-walled hinge area made of the same material as that of the protective cover members and respective side edges thereof remote from the outwardly exposed saw-toothed edges of the movable blades 61a and 61b.

Respective ends of the first and second movable blades 61a and 61b adjacent the casing 1 are coupled with the axial rods 31a and 31b through connecting pieces 67a and 67b. Either one of respective connections between the movable blades 61a and 61b and the associated connecting pieces 67a and 67b or one of connections between the connecting pieces 67a and 67b and the associated axial rods 31a and 31b is preferably of a releasable design so that the cutter head 6 can be separated from the casing 1 to facilitate a cleaning of the blade assembly. For this purpose, any known releasable connection may be employed.

It is preferable that the first and second movable blades 61a and 61b employed in the cutter head 6 of the structure described above are so arranged and so positioned as to align substantially coaxially with the first and second movable elements 21a and 21b forming respective parts of the electromagnetic linear actuator 2. In the first embodiment of the present invention now under discussion, the use has been made of the two movable blades 61a and 61b that are adapted to be reciprocatingly driven in respective phases opposite to each other, wherefore for a given cutting efficiency the stroke of movement of each movable blade 61a or 61b can advantageously be reduced substantially half the stroke of movement of a movable blade that is used in combination with a stationary blade. This means that the stroke of movement of each movable element 21a or 21b can be reduced substantially half the stroke of movement of a single movable element and, for this reason, the electromagnetic linear actuator 2 can be assembled compact in size. By way of example, it is possible for the electromagnetic linear actuator of a size, about 10 mm in diameter and about 17 mm in length, to provide a driving force and a stroke of movement that are required in the electric shaver for each movable blade.

Figure 8:
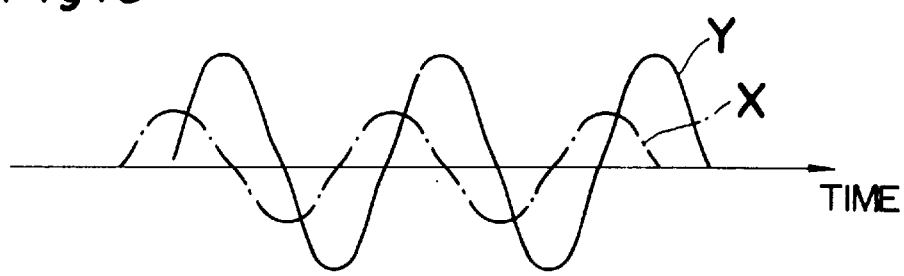
FIG. 8 is a diagram showing the relationship between the waveform of an output from the circuit of FIG. 7 and the waveform of an alternating voltage pulse flowing across an electromagnetic coil of the electromagnetic linear actuator.

The electric shaver of the structure described above operates in the following manner. So long as the electromagnetic coil 22 has not yet been energized, the first and second movable elements 21a and 21b are held in a neutral position sandwiched between the elastic tongues of the support spring members 32a and 32b, respectively. An direct current power from the power source 11 is supplied to any known rectangular wave generator provided on the circuit board 11. The rectangular wave generator applies to the electromagnetic coil 22 an alternating voltage pulse having its polarity cyclically reversed. Since the alternating voltage pulse of a waveform shown by X in FIG. 8 flows through the electromagnetic coil 22 when it is so supplied thereto, respective polarities at the opposite ends of the electromagnetic coil 22 are cyclically reversed relative to each other according to the frequency of the alternating voltage pulse. It is to be noted that a curve shown by Y in FIG. 8 represents a displacement such as amplitude, velocity and acceleration of reciprocating motion of any one of the movable elements.

More specifically, if as shown in FIG. 9A one end of the electromagnetic coil 22 adjacent the cutter head 6 is polarized to a polarity opposite to the polarity (N-pole) of the first surface of the permanent magnet 25 and the other end of the electromagnetic coil 22 is polarized to the same polarity as the polarity (S-pole) of the second surface of the permanent magnet 25, the first movable element 21a is magnetically attracted in a direction towards the cutter head 6 while the second movable element 21b is magnetically attracted in a direction opposite to the cutter head 6. Conversely, if as shown in FIG. 9B that one end of the electromagnetic coil 22 adjacent the cutter head 6 is polarized to the same polarity as the polarity (N-pole) of the first surface of the permanent magnet 25 and that other end of the electromagnetic coil 22 is polarized to a polarity opposite to the polarity (S-pole) of the second surface of the permanent magnet 25, the first movable element 21a is magnetically attracted in a direction opposite to the cutter head 6 while the second movable element 21b is magnetically attracted in a direction towards the cutter head 6.

Accordingly, supply of the alternating voltage pulse to the electromagnetic coil 22 results in cyclical reciprocating motion of the first and second movable elements 21a and 21b and, hence, the first and second movable blades 61a and 61b in respective directions opposite to each other. In response to the reciprocating motion of the first and second movable elements 21a and 21b in respective phases opposite to each other, the elastic tongues of the support spring members 32a and 32b are correspondingly cyclically displaced against their own resiliency in respective directions opposite to each other. If, however, at least the elastic tongues of any one of the support spring members 32a and 32b is so designed as to have a resonance frequency substantially equal to that of reciprocating motion of the corresponding movable element 21a or 21b, the movable elements 21a and 21b can be driven efficiently.

While in the foregoing embodiment the two blades employed therein have been described as movable, they may be stationary and movable blades, respectively. In such case, the movable element associated with the stationary blade has to be restrained immovable. Where a combination of the stationary and movable blades are employed, it may be practical to employ the electromagnetic linear actuator 2 of a structure shown in FIGS. 10 to 15 as will be described later.

(Second Embodiment)

Referring first to FIGS. 13 and 14, the cutter head 6a utilizing the stationary blade and the movable blade will be described. The cutter head 6a is substantially similar in structure to the cutter head 5 shown in FIG. 5, but differs therefrom in that in place of one of the movable blades and its associated component parts shown in FIG. 5 a stationary blade 60 is employed. In other words, the stationary blade 60 is, as best shown in FIG. 14, interposed between the movable blade 61 and the protective cover member 62 while support pins formed integrally with the protective cover member 62 extend through respective square apertures defined in the stationary blade 60, and the leaf spring member 63 is interposed between the movable blade 61 and the protective cover member 62a to thereby bias the movable blade 61 towards the stationary blade 60. The linear bearing shown in FIG. 5, although not employed in the cutter head 6a, may be employed and interposed together with a backup plate between the leaf spring member 63 and the movable blade 61 if so desired. As a matter of course, each of the support pins integral with the protective cover member 62b has a square cross-section of a size substantially equal to that of the corresponding square aperture in the stationary blade 60 and, therefore, the stationary blade 60 is kept immovable.

The electromagnetic linear actuator 2a employed in the practice of the second embodiment of the present invention is of a design comprising, as shown in FIGS. 10 to 12, the stator 20 of a substantially hollow cylindrical configuration including the tubular electromagnetic coil 22 encased within the clad casing 29, a plurality of, for example, four permanent magnets 25a secured to an inner peripheral surface of the tubular electromagnetic coil 22 through trough-shaped insulating members 27 equal in number to the number of the permanent magnets 25a, and a substantially hollow cylindrical movable element 21 made of a magnetizable material and disposed inside the permanent magnets 25a in coaxial relation therewith. An axial rod 31 connected at one end with the movable blade 61 through a connecting piece 67 (FIG. 13) extends concentrically through the movable element 21 and is coupled therewith for movement together therewith. Opposite ends of the axial rod 31 connected with the movable element 21 in the manner described above extend outwardly from adjacent end walls of the clad casing 29.

As clearly shown in FIG. 11, the permanent magnets 25a are of a generally arcuate cross-section and are disposed within the tubular electromagnetic coil 22 and spaced an equal distance from each other about the longitudinal axis of the tubular electromagnetic coil 22. The movable element 21 is reciprocatingly movable within the hollow of the electromagnetic coil 22 in a direction coaxial with the longitudinal axis of the electromagnetic coil 22. Each of the permanent magnets 25 has a first surface confronting the movable element 21 and a second surface confronting the adjacent trough-like insulating member 27, the first and second surfaces being magnetized to S-pole and N-pole, respectively, as shown in FIGS. 15A and 15B.

Figure 15A:
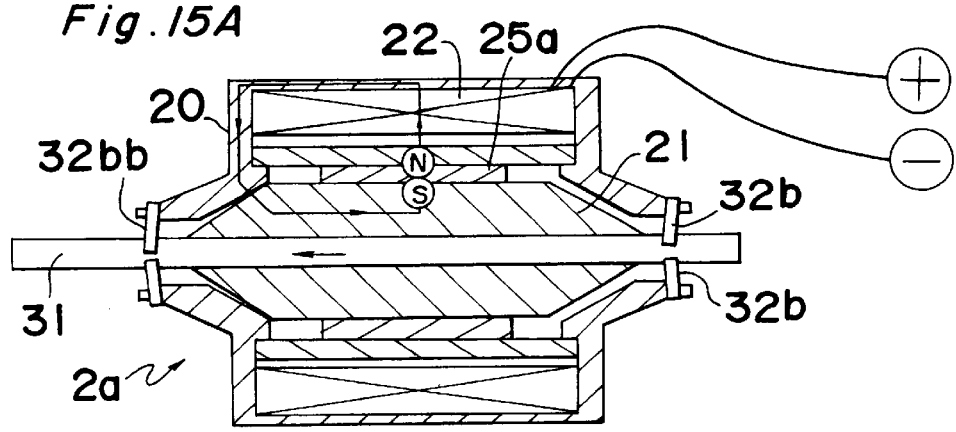
FIGS. 15A and 15B are schematic side sectional views used to explain the sequence of operation of the electromagnetic linear actuator used in the electric shaver of FIG. 10.
Figure 15B:
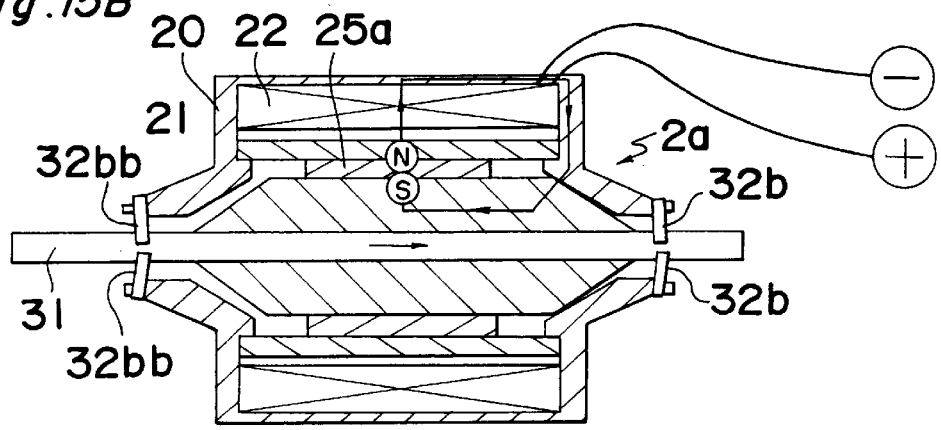

As shown in FIGS. 15A and 15B, respective portions of the axial rod 31 protruding outwardly from the opposite end walls of the clad casing 29 are supported by the respective end walls of the clad casing 29 by means of associated pairs of leaf spring members 32b and 32bb with an outer peripheral surface of the movable element 21 spaced an equal distance from the permanent magnets 25a to define an annular magnetic gap therebetween. More specifically, as clearly shown in FIG. 12, each pair of the leaf spring members 32b or 32bb is fixed at one end to the corresponding end wall of the clad casing 29, the opposite end thereof being formed with a generally semi-circular cutout. The leaf spring members 32b or 32bb of each pair are rigidly secured to the corresponding end wall of the clad casing 29. In this condition, the respective semi-circular cutouts confront with each other and engaged in a circumferentially extending groove defined in that portion of the axial rod 31.

Accordingly, it will readily be understood that the respective pairs of the leaf spring members 32b and 32bb at the opposite ends of the clad casing 29 do not only support the movable element 21 in a floated fashion so as to form the uniform magnetic gap between the outer peripheral surface of the movable element 21 and the inner surfaces of the permanent magnets 25a, but are displaceable against their own resiliency upon movement of the movable element 21.

Different states of operation of the electromagnetic linear actuator 2a of the structure described above are shown in FIGS. 15A and 15B, respectively. Even in this embodiment, the alternating voltage pulse outputted from any known rectangular wave generator provided on the circuit board is supplied to the electromagnetic coil 22 as is the case with the previously described embodiment. More specifically, assuming that as shown in FIG. 15A one end of the electromagnetic coil 22 remote from the cutter head 6 is polarized to the S-pole, a magnetic loop circuit is formed as shown by the arrow in FIG. 15A and, therefore, the movable element 21 can be magnetically attracted in a direction counter to the cutter head 6. Conversely, if as shown in FIG. 15B the other end of the electromagnetic coil 11 adjacent the cutter head 6 is polarized to the S-pole, a different magnetic loop circuit shown by the arrow in FIG. 15B is formed and the movable element 21 can be magnetically attracted in a direction towards the cutter head 6.

Accordingly, supply of the alternating voltage pulse to the electromagnetic coil 22 results in cyclical reciprocating motion of the movable element 21 and, hence, the movable blades 61 relative to the stationary blade 60 and, in response to the reciprocating motion of the movable element 21, the pairs of the support spring members 32b and 32bb are correspondingly cyclically displaced against their own resiliency in respective directions opposite to each other. If the pairs of the support spring members 32b and 32bb are so designed as to have a resonance frequency substantially equal to that of reciprocating motion of the movable element 21, the movable element 21 can be driven efficiently.

(Third Embodiment)

The electromagnetic linear actuator 2b employed in the electric shaver according to a third embodiment of the present invention is shown in FIGS. 16 to 20. In this third embodiment, the two movable blades 61a and 61b are employed as is the case with the previously described first embodiment and are adapted to be driven in respective phases opposite to each other. While in the electromagnetic linear actuator 2 in the first embodiment makes use of the single permanent magnet 25 with the movable elements 21a and 21b positioned on respective sides of the permanent magnet 25, the electromagnetic linear actuator 2b in the third embodiment which will follow makes use of a hollow cylindrical permanent magnet 25b and hollow cylindrical movable elements 21c and 21d positioned radially inside and outside the hollow cylindrical permanent magnet 25b.

Figure 17:
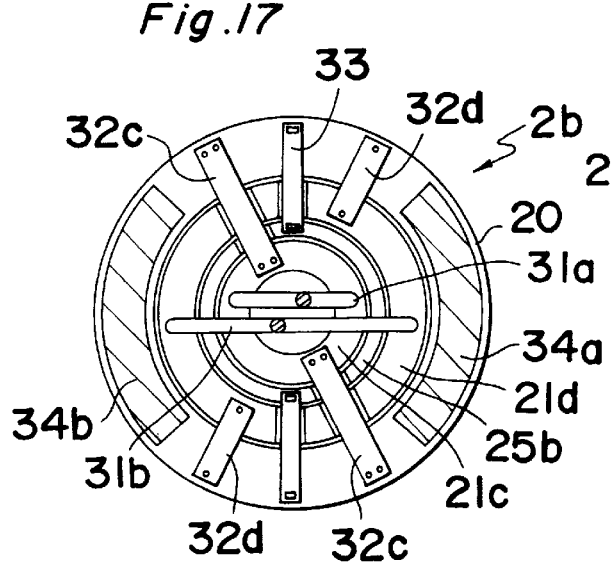
FIG. 17 is a top end view, with a portion shown in section, of the electromagnetic linear actuator used in the electric shaver of FIG. 16.

Referring particularly to FIGS. 16 and 17, the electromagnetic linear actuator 2b comprises the hollow cylindrical stator 20 including the tubular electromagnetic coil 22, the first movable element 21c of a hollow cylindrical shape coaxially disposed within the hollow of the stator 20, the second movable element 21d of a hollow cylindrical shape coaxially disposed radially outside the first movable element 21c, and a hollow cylindrical permanent magnet 25b coaxially disposed within an annular space delimited between the first and second movable elements 21c and 21d. The first movable element 21c is supported at a predetermined position by means of leaf spring members 32c and 32cc (the leaf spring member 32cc being not shown, but disposed on one side opposite to the leaf spring member 32c) that extend radially between opposite ends of the first movable element 21c and opposite ends of a cylindrical clad casing of the stator 20 enclosing the electromagnet coil 22, respectively, whereas the second movable element 21d is supported at a predetermined position by means of leaf spring members 32d and 32dd (the leaf spring member 32dd being not shown, but disposed on one side opposite to the leaf spring member 32d) that extend radially between opposite ends of the second movable element 21d and the opposite ends of the clad casing, respectively. Similarly, the permanent magnet 25b is also supported at a predetermined position by means of fitting plates 33 that extend radially between opposite ends of the permanent magnet 25b and the opposite ends of the clad casing, respectively.

As clearly shown in FIG. 17, the two leaf spring members 32c and 32cc or 32d and 32dd at each end of the stator 20 as well as the fitting plates 33 are preferably spaced 180 degrees in a circumferential direction of the stator 20.

Figure 18:
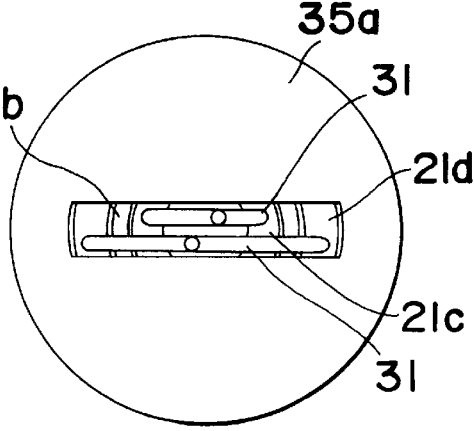
FIG. 18 is a top plan view of the electromagnetic linear actuator used in the electric shaver of FIG. 16.

Also, opposite ends of the clad casing of the stator 20 are fitted with respective end plates 35a and 35b, each made of a magnetizable material and used to form the magnetic circuit, through arcuately sectioned projections 34 formed integrally therewith. One of the end plates 35a and 35b, for example, at least the end plate 35a adjacent the cutter head 6 is formed with a generally rectangular opening as shown in FIG. 18, in which opening the first and second axial rods 31a and 31b connected respectively with the first and second movable elements 21c and 21d are positioned as will be described later.

The axial rod 31a connected with the first movable blade 61a has one end remote from the movable blade 61a which is, as shown in FIG. 19A, bifurcated to have two legs that straddle over the hollow of the first movable element 21c and are in turn secured respectively to circumferentially 180° spaced portions of the end of the first movable element 21c. Similarly, the axial rod 31b connected with the second movable blade 61b has one end remote from the movable blade 61b which is, as shown in FIG. 19B, bifurcated to have two legs that straddle over both of the first movable element 21c and the permanents magnet 25b and are in turn secured respectively to circumferentially 180° spaced portions of the end of the second movable element 21d. The bifurcated ends of each of the axial rods 31a and 31b are so designed and so configured as to permit the associated axial rod 31a or 31b to be positioned as close to the longitudinal axis of the stator 20 and, hence, the first movable element 21c positioned inside the second movable element 21d as possible.

Figure 20A:
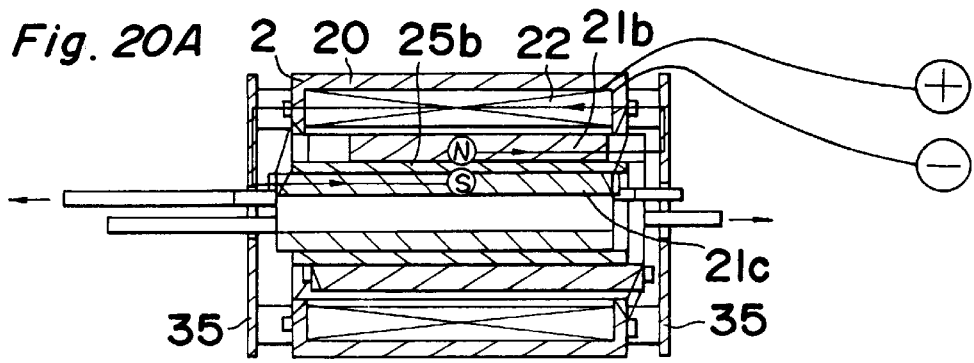
FIGS. 20A and 20B are schematic side sectional views used to explain the sequence of operation of the electromagnetic linear actuator used in the electric shaver of FIG. 16.
Figure 20B:
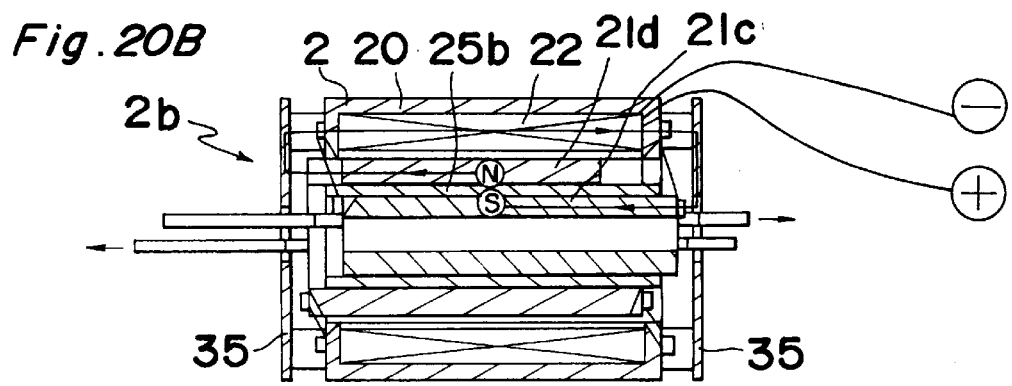

While in the electromagnetic linear actuator 2b employed in the third embodiment, the cylindrical permanent magnet 25b has its inner and outer peripheral surfaces polarized to opposite poles, respectively, they are polarized to S- and N-poles, respectively, in the illustrated embodiment as shown in FIGS. 20A and 20B. Accordingly, as is the case with the previously described embodiment supply of the alternating voltage pulse to the electromagnetic coil 22 results in formation of such alternating magnetic circuits as shown by the arrows in FIGS. 20A and 20B, respectively. Consequently, the first and second movable elements 21c and 21d disposed concentrically with each other are reciprocatingly driven relative to the stator 20 in respective phases opposite to each other. Accordingly, as is the case with the previously described first embodiment, the first and second movable blades 61A and 61B reciprocate in respective phases opposite to each other to achieve hair cutting.

It is to be noted that in the first embodiment, without that end of each axial rod 31a or 31b being bifurcated, it may be connected with the corresponding movable element 21c or 21d by bending the end of the associated axial rod 31a or 31b. However, considering the load which would be imposed on the movable blades 61a and 61b during the actual hair cutting, the use of the bifurcated legs such as shown is advantageous in terms of stability of the movable blades 61a and 61b. A similar description equally applies to the first embodiment. In other words, although in the first embodiment the axial rods 31a and 31b are connected with the associated movable elements 21a and 21b at a position as close to the longitudinal axis of the stator 20 as possible, connection of the axial rods with the associated movable elements 21a and 21b through the bifurcated legs as is the case with the third embodiment is effective to support the movable blades 61a and 61b in a stabilized fashion.

(Fourth Embodiment)

In the electromagnetic linear actuator 2c shown in FIG. 21 according to a fourth embodiment of the present invention, the single movable element 21 is employed as is the case with the second embodiment as shown in FIG. 10. Accordingly, even in this embodiment, the movable blade 61 reciprocates relative to the stationary blade 60. The hollow cylindrical stator 20 in the electromagnetic linear actuator 2c has a plurality of intermediate pole pieces 20a, positioned substantially intermediate of the axial length of the stator 20 and protruding radially inwardly of the stator 20, and side pole pieces 20b and 20bb formed in respective end walls at opposite ends of the stator 20. Each of the intermediate pole pieces 20a is wound with a respective portion of the electromagnetic coil 22, and a permanent magnet 25c cooperable with the electromagnetic coil 22 is fixed to the movable element 21 coaxially housed within the hollow of the stator 20. A back yoke 29 is interposed between the movable element 21 and the axial rod 31.

The axial rod 31 extends coaxially through the movable element 21 for movement together therewith. The movable element 21 carrying the permanent magnet 25c is normally supported so as to assume a neutral position relative to the intermediate pole pieces 20a of the stator 20 by means of biasing springs 32e and 32ee that are mounted around a portion of the axial rod 31 encompassed between one end of the movable element 21 and the adjacent end wall of the stator 20 and another portion of the axial rod 31 encompassed between the other end of the movable element 21 and the adjacent end wall of the stator 20, respectively.

Accordingly, supply of the alternating voltage pulse to the electromagnetic coil 22 results in cyclic change in polarity of the intermediate pole pieces 20a of the stator 20 according to the frequency of the alternating voltage pulse and, therefore, the permanent magnet 25c carried by the movable element 21 can be reciprocatingly driven together with the movable element 21 by the action of the magnetic forces of attraction and repulsion that are alternately developed between the intermediate pole pieces 20a and the side pole pieces 20b of the stator 20. Since the axial rod 31 moves together with the movable element 21, the movable blade 61 reciprocates relative to the stationary blade 60.

It is to be noted although in this embodiment the permanent magnet 25c has been described as fixedly secured to the movable element 21, the movable element 21 itself may be made of a permanent magnet.

(Fifth Embodiment)

Figure 22:
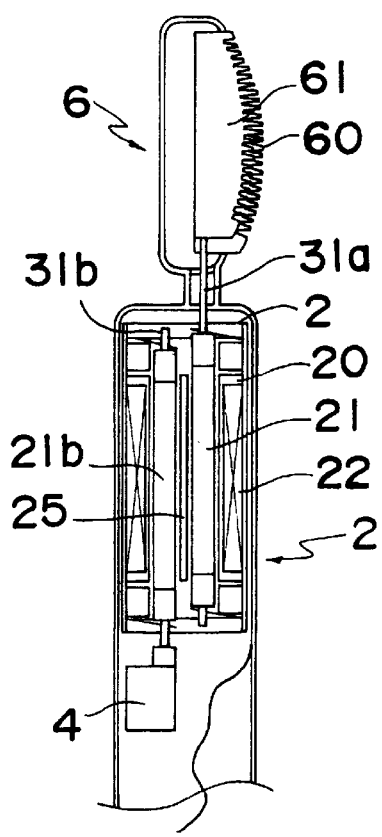
FIG. 22 is a schematic longitudinal sectional view of the electric shaver according to a fifth embodiment of the present invention.
Figure 23A:
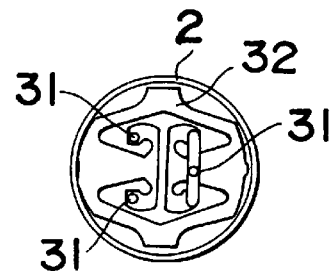
FIGS. 23A and 23B are top and bottom end views, respectively, showing support spring members for supporting the movable elements of the electromagnetic linear actuator used in the electric shaver of FIG. 22.
Figure 23B:
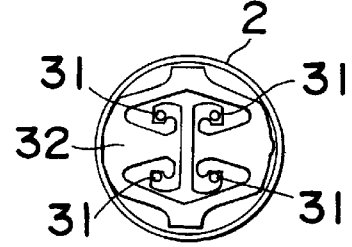

The electromagnetic linear actuator 2 according to a fifth embodiment of the present invention is shown in FIGS. 22, 23A and 23B. This electromagnetic linear actuator 2 is of a structure substantially similar to the electromagnetic linear actuator 2 in the first embodiment, but the cutter head employed therewith makes use of the stationary blade 60 and the movable blade 61 as is the case with that in the second embodiment shown in FIGS. 13 and 14. Since as has been described in connection with the second embodiment the stationary blade 60 is fitted to the protective cover, one of the movable elements 21a and 21b shown in FIG. 22 which is not connected with the movable blade 61, for example, the movable element 21b is provided with a counterweight 4 fitted to one end of the axial rod 31b remote from the cutter head 6a, to thereby secure a balanced movement of the movable blade 61.

FIGS. 23A and 23B illustrate the manner in which the movable elements 21a and 21b are movably supported by the respective support spring members 32a and 32b positioned respectively at the opposite ends of the stator 20.

In the embodiment shown in FIG. 22, reciprocating movement of the movable element 21a is utilized to drive the movable blade 61 whereas the movable element 21b plays nothing, that is, moves idle. It is, however, contemplated to design the movable element 21a, that drives the movable blade, to utilize the idle movement of the movable element 21b, and this possibility will now be described with reference to FIGS. 24 and 25.

(First Modification of the Fifth Embodiment)

Figure 24:
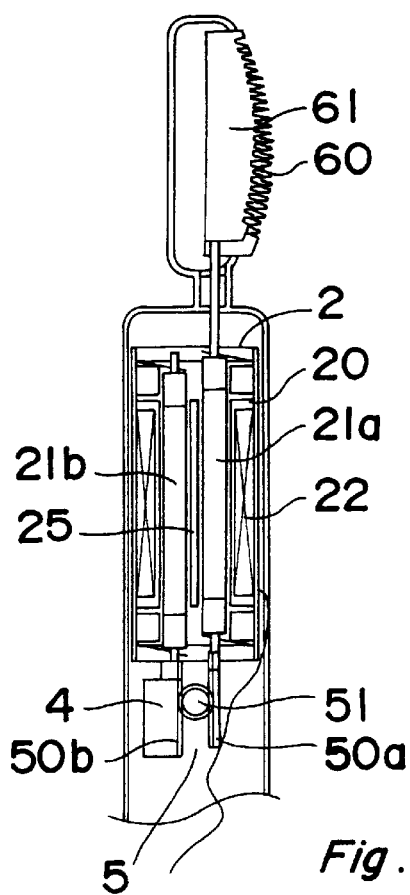
FIGS. 24 and 25 are schematic longitudinal sectional views showing the electric shaver according to the fifth embodiment and its modification, respectively.

In the modification shown in FIG. 24, arrangement is made so that the movement of the movable element 21b can be transmitted to the movable element 21a in a phase opposite to that of movement of the movable element 21a. For this purpose, respective lower ends of the movable elements 21a and 21b are connected together through a linkage means 5. The linkage means 5 includes a pinion 51 interposed between linear gear members 50a and 50b that are respectively formed in the lower ends of the movable elements 21a and 21b. In such case, it is clear that even though the load imposed on the movable blade 61 during the actual hair cutting is relatively large, the driving force sufficient to overcome it can be obtained.

(Second Modification of the Fifth Embodiment)

Figure 25:
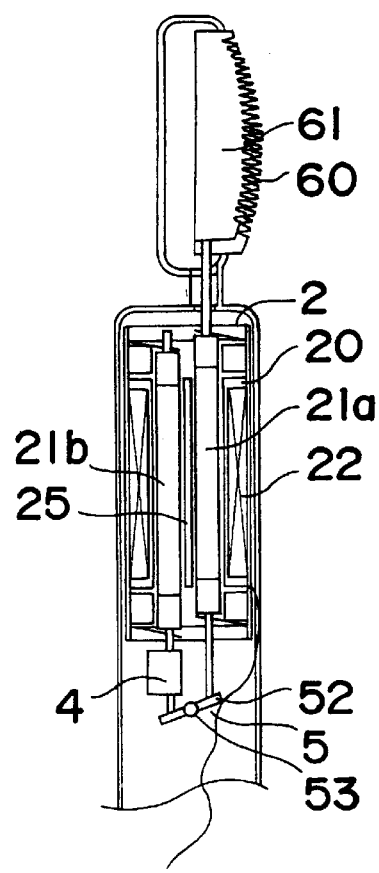

In the modification shown in FIG. 25, the linkage means 5 comprises a link 25. Specifically, the link 52 is rotatable at a substantially intermediate portion thereof with its opposite ends pivotally connected with the respective lower ends of the axial rods 31a and 31b that extend downwardly from the associated movable elements 21a and 21b. Accordingly, movement of one of the movable elements in one direction can be transmitted to the other of the movable elements through the link 52 and, therefore, even in this case, it is clear that even though the load imposed on the movable blade 61 during the actual hair cutting is relatively large, the driving force sufficient to overcome it can be obtained.

(Sixth Embodiment)

Figure 26:
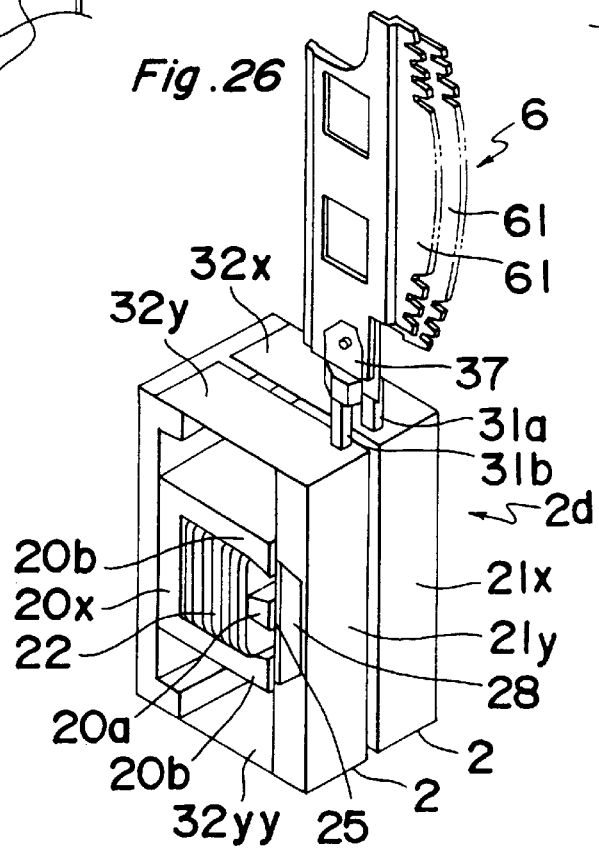
FIG. 26 is a schematic perspective view, with a casing removed away, showing the electric shaver according to a sixth embodiment of the present invention.

A sixth embodiment of the present invention is shown in FIG. 26. The electromagnetic linear actuator 2d employed in this embodiment has an appearance different from the electromagnetic linear actuator 2c shown in FIG. 21, but has a structure, and functions in a manner, generally similar to one of longitudinal halves of the electromagnetic linear actuator 2c. In other words, the electromagnetic linear actuator 2d shown in FIG. 26 comprises a stator 20x including pole pieces 20aa and 20bb with the electromagnetic coil 22 wound around the pole piece 20aa, first and first movable elements 21x and 21y juxtaposed with each other, axial rods 31a and 31b movable together with the respective movable elements 21x and 21y, flexible leaf springs 32x, 31xx and 32y, 32yy (leaf springs 32xx is invisible in FIG. 26) connecting the associated movable elements 21x and 21y with the stator 20x, and permanent magnets 25x and 25y (only permanent magnet 25y being shown) secured to the respective movable elements 21x and 21y. It is to be noted that each of the movable elements 21x and 21y may be made of a permanent magnet.

Respective surfaces of the permanent magnets 25x and 25y facing towards the pole pieces 20aa are so opposite to each other that when the electromagnetic coil 22 is excited, one of the movable elements can be moved in one direction and the other of the movable elements can be moved in the opposite direction. Accordingly, it is clear that supply of the alternating voltage pulse to the electromagnetic coil 22 results in movement of the first and second movable elements 21x and 21y in respective phases opposite to each other.

In any one of the first to sixth embodiments hereinabove described, the cutter head includes the two movable blades or the combination of the movable blade with the stationary blade and, in either case, each of the blades is in the form of a generally rectangular plate-like configuration with one side edge saw-toothed. However, in place of the use of the flat plate-like blades, the use may be contemplated of a stationary blade member or inner blade in the form of a perforated metal foil in combination with at least one movable blade member or outer blade including a plurality of substantially semi-circular blades such as disclosed in the previously discussed European Patent Application. Some of embodiments in which the cutter head comprising such stationary blade member and such movable blade member is employed in combination with the electromagnetic linear actuator will now be described hereinafter.

(Seventh Embodiment)

The electric shaver according to a seventh embodiment of the present invention is shown in FIGS. 27 to 29. In this embodiment, the electromagnetic linear actuator 2 of the structure shown in FIGS. 22 and 23 is employed. However, since this embodiment differs from the previous embodiments only in respect of the specific structure of the cutter head, not only can the electromagnetic linear actuator shown in FIG. 22, but also the electromagnetic linear actuator according to any of the embodiments other than that shown in FIG. 22 can be equally employed.

As shown in FIGS. 27 to 29, the cutter head 6b is, together with the electromagnetic linear actuator 2, accommodated within a generally cylindrical casing 1a of a longitudinally split two-component type with the cutter head 6b positioned adjacent one end of this casing 1a. A side wall of the casing 1a adjacent that end is formed with a generally rectangular opening which is closed by a perforated metal foil (outer blade) 60x that serves as a stationary blade and that is secured to the casing in a curved fashion within the rectangular opening. A movable blade member (inner blade) 61x comprising an inner blade carrier of synthetic resin having a plurality of generally semi-circular blades rigidly mounted thereon cooperates with the perforated metal foil 60x to cut hairs in a manner well known to those skilled in the art. For this reason, the inner blade carrier of the movable blade member 61x is pivotally connected at one end with the axial rod 31a coupled with the first movable element 21a.

Positioned below the inner blade carrier of the movable blade member 61x is a generally rectangular support member 13 that is biased towards the perforated metal foil 60x by a coil spring 14 used as a biasing spring, and the inner blade carrier is mounted on this support member 13 through a plurality of needle rollers 16. Although not shown, the needle rollers 16 are spacedly retained by a roller retainer. The coil spring 14 is retained in position as received within a telescopic guide barrel 15 including a large-diameter barrel member, formed integrally with an undersurface of the support member 13, and a reduced-diameter barrel member fixed to an inner peripheral surface of the casing 1a.

In this structure, reciprocating movement of the movable element 21a is transmitted to the movable blade member 61x coupled therewith through the axial rod 31 to permit the movable blade member 61x to accomplish the hair cutting in cooperation with the perforated metal foil 60x. Moreover, the hairs can advantageously cut to a relatively short length as compared with that accomplished by the use of the combination of the stationary blade with the movable blade or the two movable blades.

(Eighth Embodiment)

The electric shaver according to an eighth embodiment of the present invention is shown in FIGS. 30 and 31. Even this embodiment differs from any one of the embodiments shown in FIGS. 1 to 26 only in respect of the details of the cutter head and differs from the seventh embodiment shown in FIGS. 26 to 29 in respect of the number of movable blade members 61x used. In this embodiment, two movable blade members 61xa and 61xb of an identical structure are employed and mounted on the support member 13 through the needle rollers 16 in parallel relation to each other as best shown in FIG. 31.

The electromagnetic linear actuator employed may be of a structure substantially similar to that according to any one of the first, third and sixth embodiments shown respectively in FIGS. 1 to 9, FIGS. 16 to 20 and FIG. 26, but in the embodiment shown in FIG. 30, the electromagnetic linear actuator 2 according to the first embodiment is employed.

It is to be noted that since the eighth embodiment makes use of two inner blades, that is, movable blade members 61xa and 61xb, the perforated metal foil 60x used as the outer blade, that is, the stationary blade member is preferred to have a shape similar to the shape of twin mountains as shown in FIG. 31.

(Ninth Embodiment)

The electric shaver according to a ninth embodiment is shown in FIGS. 32 and 33. Although this electric shaver is substantially similar to that shown in FIGS. 30 and 31, the use is made of an intermediate movable blade member 61x reciprocatingly movable in synchronism with one of the movable blade members (inner blades) 61xa and 61xb, for example, the movable blade member 61xa. This intermediate movable blade member 61xc is of a structure substantially similar to any one of the movable blade members 61xa and 61xb, but has a relatively small width so that the intermediate movable blade member 61xc can be positioned within a limited space between the movable blade members 61xa and 61xb.

In order to allow the intermediate movable member 61xc to be moved in synchronism with the movable blade member 61xa, that end of the axial rod 31a is bifurcated to provide two connecting legs which are in turn rigidly connected respectively with the movable blade member 61xa and the intermediate blade member 61xc.

Even in this embodiment, the electromagnetic linear actuator of the structure according to any one of the first, third and sixth embodiments shown respectively in FIGS. 1 to 9, FIGS. 16 to 20 and FIG. 26 can be employed.

What is claimed is:

1. An electric shaver, comprising:
   an electromagnetic linear actuator including a stator having an electromagnetic coil;
   said stator having a substantially hollow cylindrical shape with at least first and second recesses;
   first and second movable members mounted in said first and second recess, respectively;
   said linear actuator driving said first and second movable members cyclically back and forth in said first and second recesses, a cycle of movement of said first movable member being 180° out of phase with a cycle of movement of said second movable member such that any movement of said first movable member is in a direction opposite of said second movable member; and
   a cutting head including first and second blade members aligned in a direction of movement of said first and second movable members respectively, said first blade member being mounted on said first movable member;
   wherein movement of said first and second movable members drives at lease one of said first and second blade members relative to the other of said first and second blade members to cut hair placed adjacent hereto.

2. The electric shaver of claim 1, further comprising:
   a permanent magnet disposed between said first and second movable members; and
   said first and second movable members are at least partially made of a magnetizable material.

3. The electric shaver of claim 1, further comprising a linkage system between said first and second movable members that transmits a drive force of said one of said first and second movable members to said other of said first and second movable members.

4. The electric shaver of claim 3, further comprising a counterweight connected to said second movable member.

5. The electric shaver of claim 3, wherein said linkage system includes first and second racks provided on each of said first and second movable members, respectively, and a pinion rotatable about a fixed axis that engages said first and second racks.

6. The electric shaver of claim 4, wherein said linkage system includes first and second racks provided on each of said first and second movable members, respectively, and a pinion rotatable about a fixed axis that engages said first and second racks.

7. The electric shaver of claim 3, wherein said linkage system includes a lever pivotally mounted at an intermediate portion thereof, having first and second ends connected to said first and second movable members, respectively.

8. The electric shaver of claim 4, wherein said linkage system includes a lever pivotally mounted at an intermediate portion thereof, having first and second ends connected to said first and second movable members, respectively.

9. The electric shaver of claim 1, wherein said first blade member is movable, and said second blade member is fixed.

10. The electric shaver of claim 1, wherein each of said first and second blade members is drivingly connected to said first and second movable elements, respectively.

11. The electric shaver of claim 1, wherein said first and second movable members have a substantially semicircular cross section, and are disposed on respective sides of a longitudinal center axis of the cylindrical stator.

12. The electric shaver of claim 1, wherein said first and second movable members comprise inner and outer cylindrical elements, at least said outer cylindrical element being hollow, said inner cylindrical element being positioned inside said outer cylindrical element, and said inner and outer cylindrical elements are coaxial with a longitudinal center axis of said cylindrical stator.

13. The electric shaver of claim 12, wherein said inner cylindrical element is hollow.

14. The electric shaver of claim 1, wherein each of said first and second movable members has an end, opposite a blade end, supported by a leaf spring, and wherein a magnetic gap is formed between said spring and said stator, and said spring and each of said first and second movable members.

15. An electric shaver, comprising:

an electromagnetic linear actuator including a hollow cylindrical stator having an electromagnetic coil;

a permanent magnet mounted in said hollow portion of said stator to divide said hollow portion into first and second recesses;

first and second movable members, made of magnetizable material, mounted in said first and second recess, respectively;

an alternating wave generator that drives said electric coil; and a cutting head including first and second blade members being mounted on said first and second movable members;

wherein a magnetic field established by said permanent magnet and said coil when driven by said alternative wave generator will move said first and second movable members cyclically back and forth in said first and second recesses, a cycle of movement of said first movable member being 180° out of phase with a cycle of movement of said second movable member such that any movement of said first movable member is in a direction opposite of said second movable member;

wherein movement of said first and second movable members drives said first and second cutting blade members relative to each other to cut hair adjacent thereto.

16. An electric shaver, comprising:

an electromagnetic linear actuator including a hollow cylindrical stator having an electromagnetic coil;

a permanent magnet mounted in said hollow portion of said stator to divide said hollow portion into first and second recesses having substantially semicircular cross sections;

first and second movable members, made of magnetizable material, and having substantially semicircular cross sections, being movably mounted in said first and second recesses, respectively;

an alternating wave generator that drives said electric coil; and a cutting head including first and second blade members being mounted on said first and second movable members;

wherein a magnetic field established by said permanent magnet and said coil when driven by said alternative wave generator will move said first and second movable members cyclically back and forth in said first and second recesses, a cycle of movement of said first movable member being 180° out of phase with a cycle of movement of said second movable member such that any movement of said first movable member is in a direction opposite of said second movable member; and wherein movement of said first and second movable members drives said first and second blade members relative to each other to cut hair adjacent thereto.

* * * * *

UNITED STATES PATENT AND TRADEMARK OFFICE
CERTIFICATE OF CORRECTION

PATENT NO. : 6,098,288  
DATED : August 8, 2000  
INVENTOR(S) : S. Miyagawa et al.

Page 1 of 1

It is certified that error appears in the above-identified patent and that said Letters Patent is hereby corrected as shown below:

<u>Column 18,</u>  
Line 21 (claim 1, line 20) of the printed patent, "lease" should be -- least --.

Signed and Sealed this

Twenty fifth Day of September, 2001

Attest:

NICHOLAS P. GODICI  
Attesting Officer  
Acting Director of the United States Patent and Trademark Office